April 1, 1952  G. M. LARSON ET AL  2,591,443
DEVICE FOR DETERMINING CAPILLARY FRAGILITY
Filed Dec. 15, 1947

INVENTORS.
GLEN M. LARSON
HOWARD B. LEWIS
BY THEIR ATTORNEYS.
HARRIS, KIECH, FOSTER & HARRIS

Patented Apr. 1, 1952

2,591,443

UNITED STATES PATENT OFFICE 2,591,443

DEVICE FOR DETERMINING CAPILLARY FRAGILITY

Glen M. Larson and Howard B. Lewis, Los Angeles, Calif.

Application December 15, 1947, Serial No. 791,822

8 Claims. (Cl. 128—2)

Our invention relates to a device for clinically diagnostic purposes, and more particularly to a device for facilitating the determination of "capillary fragility" or the resistance of the blood capillaries to permeation by the erythrocyte or other correspondingly large molecules.

It is well known that the small blood capillaries located close to the skin, particularly at or near their extremities, have, in certain persons, a tendency to rupture or "leak" when the skin is subjected to reduced external pressure. This weakness of the capillaries may be caused by any one of several abnormal conditions and a quick and convenient method of determining the strength of the capillaries is of great value to the diagnostician.

The most practical method yet developed consists in applying a predetermined reduced external pressure to the skin surface in certain definite areas of the patient's body and determining by visual inspection the number of hemorrhages (called petechiae) resulting in a unit area. The reduced pressure should be suddenly applied, of predetermined magnitude and held for a definite period of time if the indications are to be consistent.

It has been discovered that when certain specified areas on the body surface of normal healthy persons are subjected to reduced pressures of predetermined values, the count of petechiae invariably falls within a definite range, and, by clinical testing, it has been found that when the count is in excess of this normal range, a positive indication of abnormal capillary weakness is obtained. It is a primary object of our invention to provide a device, which we prefer to term a "petechiameter," capable of being applied against the skin of a patient in the more vascular areas (such as the infraclavicular area, the inner aspect of the thigh and the upper arm) and inducing reduced pressures adjacent the skin so as to subject the flesh to reduced pressure of predetermined value tending to strain the small capillaries disposed beneath the device.

It is another object of our invention to provide a device, of the character referred to, in which is embodied optical magnifying means by means of which the petechiae caused by such reduced pressures can be observed and readily counted by the diagnostician.

Another object is to provide a petechiameter which includes a cylinder member formed with a cup-like portion or "Bier Bell" two centimeters in diameter (since this has been determined by numerous investigators in the field to be the optimum working area) at one end and adapted to be placed against the patient's skin, a plunger slidable in the cylinder member and operative, when moved in one direction, to expel air from the member and capable of being slid in the opposite direction after the cup portion has been placed against the skin, under the action of a spring disposed within the cylinder member, so as to produce a reduced pressure area or suction tending to draw the skin into the cup portion and causing rupture of capillary blood vessels beneath the cup which are incapable of withstanding the induced pressure differential.

A further object is to provide a device of the above type in which adjustable means is included for limiting the inward sliding movement of the plunger so as to produce selected pressure differentials when the plunger is subsequently slid in an outward direction.

A still further object of our invention is to provide a diagnostic device which is especially simple in construction, economical to manufacture and highly efficient in performing its intended function.

Further objects will appear from the following description and from the drawing, which is intended for the purpose of illustration only, and in which.

Figure 1:
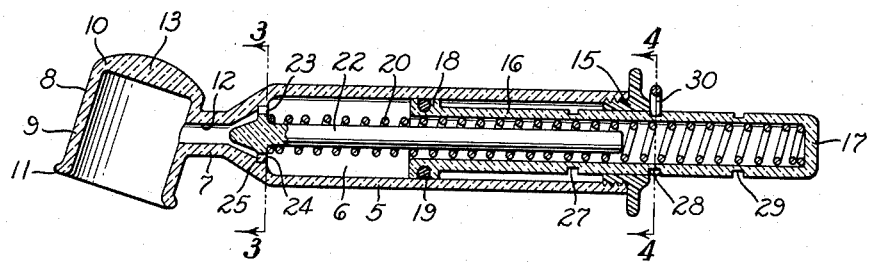
Fig. 1 is a longitudinal sectional view through our device, the plunger being shown in retracted position to expel air from the cylinder member prior to the application of the cup portion of the device against the skin of a patient.

Referring to the drawing in detail, our diagnostic device or petechiameter includes, essentially, a cylinder member 5 having a circular wall defining a suction chamber 6. The wall of the member 5 is reduced in diameter at one end to provide a neck 7, at the end of which is formed a cup-like portion 8 defined by a circular wall 9 and an end wall 10. While the axis of the cup portion 8 may be disposed normal to the axis of the cylinder member 5, we have found it preferable to arrange the axes at an angle of slightly less than 90°. The cup portion 8 preferably has a beaded rim 11 adapted to rest against the patient's skin when the device is applied to use.

Extending between the interiors of the cylinder member 5 and the cup portion 8 is an air passage 12.

In accordance with the present invention, the end wall 10 of the cup portion 8 is provided with optical magnifying means. While this means might be in the form of a lens inserted in a hole in the end wall 10, we prefer to construct the cylinder member 5 and its integral cup portion 8 from transparent material, such as glass or plastic material, and to so shape the end wall that it provides, in itself, a plano-convex magnifying lens 13 through which the patient's skin can be viewed, the optical axis of the lens being substantially normal to the skin when the rim 11 is placed thereagainst.

Figure 2:
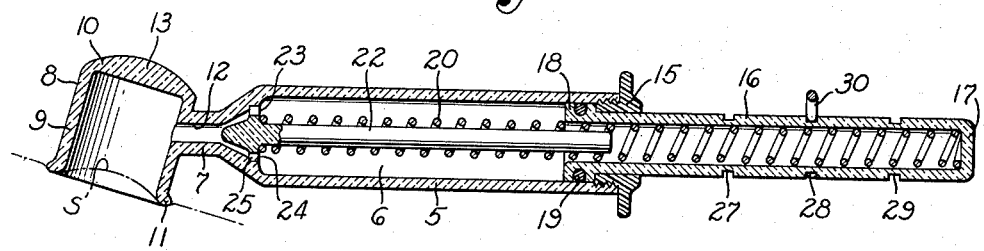
Fig. 2 is a view similar to Fig. 1 but illustrating the plunger as having been slid to extended position by the spring means so as to create a reduced pressure within the cylinder member.

The end of the cylinder member 5 opposite its cup end is internally screw-threaded to receive an annular end member 15 which is screwed thereinto. Slidable within the bore of the member 15 is a tubular plunger 16 which has an end wall 17 at its outer end and is provided with an integral piston 18 at its inner end adapted to slide within the bore of the cylinder member. A sealing ring 19 is held in an annular groove in the piston 18 and engages the internal surface of the wall of the cylinder member to provide a substantially air-tight sliding engagement. The piston 18 is adapted to engage against the inner end of the end member 15 and thus functions as a stop for limiting the outward sliding movement of the plunger 16 as shown in Fig. 2.

Figure 3:
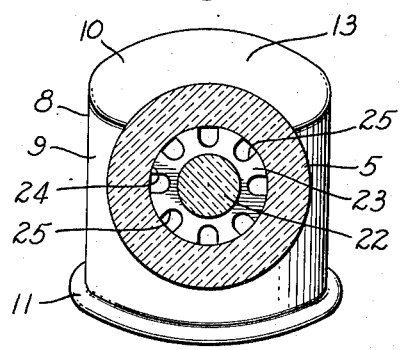
Fig. 3 is a cross-sectional view, taken on line 3—3 of Fig. 1.

The plunger 16, having once been slid inwardly to expel air from the cylinder member 5 and thereafter released, is forced in the opposite direction to extended position under the influence of a compression spring 20. The spring 20 surrounds a stem 22 which has a circular flange 23 fitted in an annular recess 24 coaxial with the passage 12, the flange having a series of openings 25 therein as shown in Fig. 3. One end of the spring 20 rests against the flange 23 while the other end thereof is disposed against the inner surface of the end wall 17 of the plunger 16 so that the spring normally acts to slide the plunger to extended position.

Figure 4:
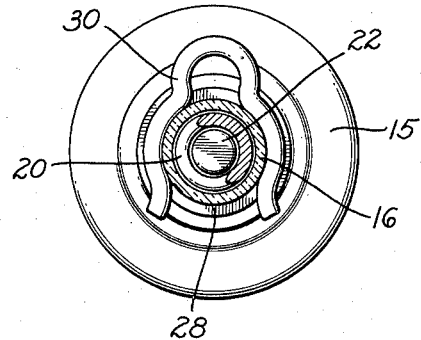
Fig. 4 is a cross-sectional view, taken on line 4—4 of Fig. 1.

It is preferable that the initial volume of air within the cylinder member and its cup portion, that is, the volume of air therein when the plunger is slid to its innermost extent, be varied so that the reduced pressure created due to subsequent extension of the plunger under the action of the spring 20 can be adjusted at the will of the diagnostician. In accordance with our invention, this selective adjustment is effected by stop means to be next described. The plunger 16 is provided with a series of peripheral grooves 27, 28 and 29 which are adapted to receive a resilient stop element, such as the snap-ring 30, shown best in Fig. 4. By disposing the snap-ring 30 selectively in any one of the grooves, the desired reduced pressure or suction can be obtained, it being noted by reference to Fig. 1 that the snap-ring is adapted to engage against the outer face of the end member 15. The grooves 27, 28 and 29 are so arranged in the plunger 16 and with respect to one another as to cause respective reduced pressures of 10 cm., 20 cm. and 30 cm. of mercury below atmospheric to be created, but it will be obvious that the grooves may be otherwise spaced to effect reduced pressures of other values.

To apply the petechiameter to use, the initial volume of air within the cylinder member 5 and its cup portion 8 is first adjusted by inserting the snap-ring 30 into the appropriate groove 27, 28 or 29. Assuming that it is desirable to create a reduced pressure equal to 20 cm. of mercury below atmospheric, the snap-ring 30 is placed in the groove 28 as shown in the drawing. When the plunger 16 is depressed or slid inwardly until the snap-ring engages the end member 15 its piston 18 will have displaced a predetermined volume of air so that the air remaining in the device has a predetermined "initial" volume. During this inward sliding movement of the plunger 16 the spring 20 is, of course, compressed.

With the plunger 16 maintained in its innermost position, the rim 11 of the cup portion 8 is placed upon a selected part of the body of the patient and held thereagainst by exerting a small manual force. The plunger 16 is then released and the spring 20 acts to slide the plunger outwardly until the piston 18 engages the end member 15. The air within the cup portion 8, passage 12 and cylinder member 5 is thus expanded to a larger volume so that a reduced pressure, equal to 20 cm. of mercury below atmosphere, is created within the device. This differential which exists between the pressure within the device and the atmospheric pressure exerted against surrounding portions of the skin, causes the enclosed area of skin S to be drawn into the cup portion as indicated in Fig. 2. The induced suction thus strains the small capillaries which are located beneath the cup portion 8 and, if their structure is incapable of withstanding such force, they rupture and cause minute hemorrhages (petechiae) under the skin. The petechiae may be readily observed and counted by the diagnostician who views the skin area through the lens 13. If the number of petechiae is within a predetermined range it is assumed that the patient has normal capillary resistance, but if the count should be above the range, need for further tests to determine which of several disorders is responsible are indicated.

While we have herein shown and described the device as embodied in a preferred form of construction, it will be apparent that various modifications might be made therein without departing from the spirit of the invention. Consequently we do not wish to be limited in this respect, but desire to be afforded the full scope of the appended claims.

We claim as our invention:

1. A device for determining capillary fragility, comprising: a cylinder member having a cup-shaped portion at one end thereof provided with a rim adapted to be placed against the skin of a person, the axis of said portion being disposed at an angle to the axis of said cylinder member, the interior of said portion being in fluid communication with the interior of said cylinder member; a tubular plunger slidable in said cylinder member and having a closed end projecting from the opposite end of said cylinder member, said plunger being adapted to expel air from said cylinder member and cup portion when slid in a first direction toward said cup portion; spring means engageable with said plunger and adapted to slide the same in the opposite direction so as to create a predetermined reduced pressure within said cylinder member and cup portion tending to draw the skin into said cup portion; and readily detachable stop means adjustable longitudinally on said plunger and adapted to engage said opposite end of said cylinder so as to limit the sliding movement of said plunger in said first direction to selected position.

2. A device as defined in claim 1, in which said stop means consists of a readily detachable element selectively engageable in any one of a series of annular grooves in said plunger.

3. A device as defined in claim 1, in which said stop means consists of a snap-ring resiliently engageable in any one of a series of grooves in said plunger.

4. A device for determining capillary fragility, comprising: a cylinder member having a cup-shaped portion at one end thereof provided with a rim adapted to be placed against the skin of a person, the axis of said portion being disposed at an angle to the axis of said cylinder member, said cylinder member having a passage therein communicating between the interiors of said cylinder member and said cup portion; a stem having a flange seated within said passage, said flange having ports therein; a hollow plunger slidable within said cylinder member and having a closed end projecting from the opposite end of said cylinder member; a spring carried by said stem within said cylinder member and said plunger and having one of its ends engaging said flange and the other of its ends engaging the closed end of said plunger, said spring normally functioning to slide said plunger outwardly; limiting means for limiting the outward sliding movement of said plunger; and adjustable stop means on said plunger engageable with said cylinder member for limiting the inward sliding movement of said plunger, inward sliding movement of said plunger causing expulsion of air from said cylinder member through said ports and said cup portion, and outward sliding movement of said plunger creating a predetermined reduced pressure within said cylinder member and said cup portion tending to draw the skin into said cup portion.

5. A device for determining capillary fragility, comprising: a cylinder member having a cup-shaped portion at one end thereof provided with a peripheral wall having a rim adapted to be placed against the skin of a person, the axis of said portion being disposed at an angle to the axis of said cylinder member, said cylinder member having a passage extending coaxially with said cylinder member and through said peripheral wall and establishing fluid communication between the interior of said portion and the interior of said cylinder member; a plunger slidable within said cylinder member and adapted to expel air from said cylinder member and cup portion when slid in one direction; spring means engageable with said plunger and adapted to slide the same in the opposite direction so as to create a predetermined reduced pressure within said cylinder member and cup portion tending to draw the skin into said cup portion; and optical magnifying means associated with said cup portion through which the skin drawn into said cup portion can be observed.

6. A device for determining capillary fragility, comprising: a cylinder member having a cup-shaped portion at one end thereof provided with a peripheral wall having a rim adapted to be placed against the skin of a person, the axis of said portion being disposed at an angle to the axis of said cylinder member, said cylinder member having a passage extending coaxially with said cylinder member and through said peripheral wall and establishing fluid communication between the interior of said portion and the interior of said cylinder member; a plunger slidable within said cylinder member and adapted to expel air from said cylinder member and cup portion when slid in one direction; and spring means engageable with said plunger and adapted to slide the same in the opposite direction so as to create a predetermined reduced pressure within said cylinder member and cup portion tending to draw the skin into said cup portion, said cup portion being of a transparent nature and so shaped that an optical magnifying lens is provided through which the skin drawn into said cup portion can be observed.

7. A device for determining capillary fragility, including: a cup member having a side wall and an end wall and having a fluid passageway therethrough, said side wall having an edge adapted to be placed against the skin of a person, said fluid passageway being adapted to have fluid evacuation means connected thereto to expel air from said cup member through said fluid passageway; and optical magnifying means forming at least part of said end wall of said cup member through which the skin surrounded by said cup member may be viewed, said optical magnifying means having an optical axis substantially normal to the skin which is viewed when said edge is placed thereagainst.

8. A device for determining capillary fragility, including: a cylinder member having a cup-shaped portion at one end adapted to be placed against the skin of a person, the interior of said cup portion being in fluid communication with the interior of said cylinder; fluid evacuation means cooperating with said cylinder member adapted to expel air from said cylinder member and said cup portion to create a reduced pressure within said cylinder member and cup portion tending to draw the skin into said cup portion; and optical magnifying means associated with said cup portion through which the skin drawn into said cup portion can be viewed in which said fluid evacuation means includes a piston adapted to slide within said cylinder member, and in which said cup portion comprises a side wall and an end wall, said side wall having a fluid passageway therethrough for providing said fluid communication, and said optical magnifying means forms at least part of said end wall.

GLEN M. LARSON.
HOWARD B. LEWIS.

REFERENCES CITED

The following references are of record in the file of this patent:

UNITED STATES PATENTS

| Number | Name | Date |
| --- | --- | --- |
| 70,087 | Hadfield | Oct. 22, 1867 |
| 391,414 | Howell | Oct. 23, 1888 |
| 758,653 | Howell | May 3, 1904 |
| 1,001,175 | Siebert, Jr. | Aug. 22, 1911 |
| 1,106,276 | Bradshaw | Aug. 4, 1914 |
| 1,107,888 | Buck | Aug. 18, 1914 |
| 1,730,535 | Rudolph | Oct. 8, 1929 |
| 2,074,401 | Kauzal | Mar. 23, 1937 |

FOREIGN PATENTS

| Number | Country | Date |
| --- | --- | --- |
| 31,254 | Switzerland | Feb. 24, 1904 |
| 579,437 | France | Oct. 16, 1924 |